Figure 1:
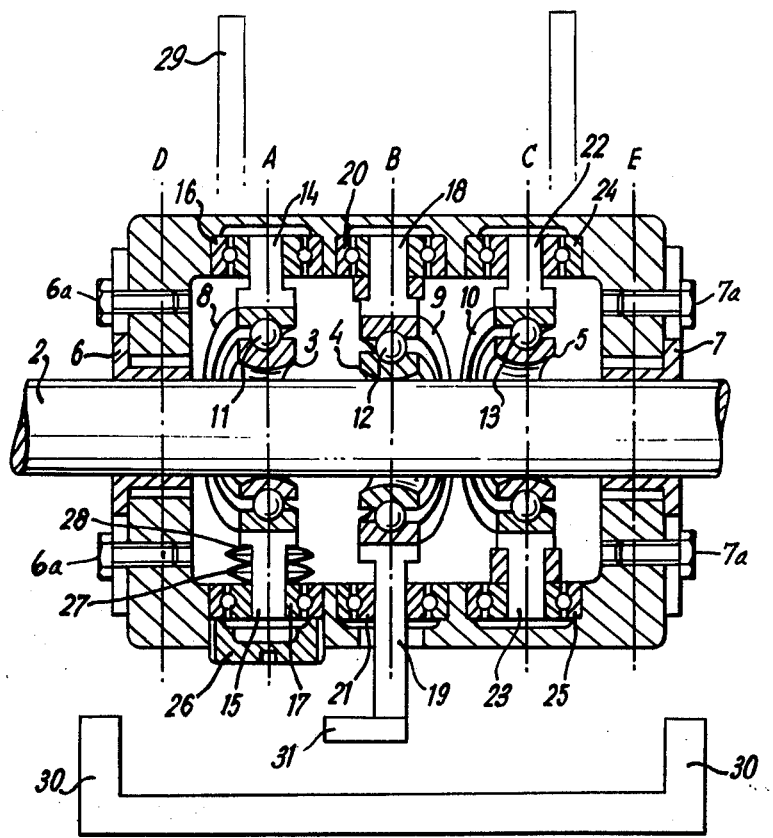

United States Patent [19]

Wardley

[11] 4,450,731
[45] May 29, 1984

[54] TRAVERSING UNIT WITH BALANCED LOAD APPLYING MEANS

[75] Inventor: George Wardley, Stockport, England

[73] Assignee: Marldon (Engineering Specialties) Limited, Denton, England

[21] Appl. No.: 262,432

[22] Filed: May 11, 1981

[30] Foreign Application Priority Data

May 9, 1980 [GB] United Kingdom ............... 8015518

[51] Int. Cl.³ ............................................. F16H 21/16
[52] U.S. Cl. ............................................. 74/25; 74/89
[58] Field of Search ...................... 74/25, 89; 104/166; 308/176

[56] References Cited

U.S. PATENT DOCUMENTS

| 2,940,322 | 6/1960 | Uhing | 74/25 X |
| 3,966,280 | 6/1976 | Olrik | 308/176 |
| 3,977,258 | 8/1976 | Bauer | 74/25 |

FOREIGN PATENT DOCUMENTS

| 620484 | 11/1962 | Belgium | 74/25 |
| 810401 | 4/1969 | Canada . | |
| 1028173 | 3/1978 | Canada . | |
| 1116009 | 10/1961 | Fed. Rep. of Germany | 74/25 |
| 1216058 | 5/1966 | Fed. Rep. of Germany . | |
| 2363743 | 3/1978 | France . | |
| 798781 | 6/1958 | United Kingdom . | |
| 1524363 | 9/1978 | United Kingdom . | |
| 1564462 | 4/1980 | United Kingdom . | |
| 1568155 | 5/1980 | United Kingdom . | |
| 2040017A | 8/1980 | United Kingdom . | |

OTHER PUBLICATIONS

Feinwicktechnik, vol. 71, No. 5, May 1967; K. R. Von Oberaurat "Riebrollen-Verlegegetriebe fur Spulenwickelmaschinen", 201–208, p. 207, FIG. 26; p. 208, line 120 (from bottom) to col. 2, line 5.

Primary Examiner—Ernest R. Purser
Attorney, Agent, or Firm—Fleit, Jacobson, Cohn & Price

[57] ABSTRACT

A traversing unit comprises a shaft 42 rotatably mounted in plain bearings 46 and 47 in a housing 41. The housing 41 houses three rings 43, 44 and 45 in contact with the shaft 42 and respectively rotationally supported in ball races 51, 52 and 53 through balls 54, 55 and 56. The rings 43 to 45 may be loaded via a mounted plate 69 comprising bearings 66 to 68 which receive corresponding pins 58, 60 and 62 integrally formed with respective races 51 to 53. This plate 69 is located axially of the shaft 42 by dowels 72 and 73 which are free to move at right angles to the shaft 42. Excess loads caused by reversal torques on the housing 41 when the direction of traverse of the rings is reversed during operation of the unit with the shaft 42 rotating and the rings 43 to 45 loaded are reduced and transferred to bearings 46 and 47 permitting higher loads to be used on the rings 43 to 45 and maintenance problems to be reduced as compared with known traversing units.

11 Claims, 3 Drawing Figures

TRAVERSING UNIT WITH BALANCED LOAD APPLYING MEANS

The present invention relates to a traversing unit of the type in which a ring surrounds a shaft and is made to traverse the shaft by rotating the shaft.

Such units are well known. One such unit is described in British Patent No. 798,781. The rate and direction of traverse of the ring across the shaft is dependent upon the angle of the plane of the ring to a plane at right angles to the axis of the shaft. By reversing this angle the direction of traverse can be reversed thus producing a reciprocating motion and by adjusting the magnitude of the angle the rate of traverse can be adjusted. The lateral or axial thrust that can be exerted by the ring as it traverses the shaft is dependent upon the loading of the ring on the shaft. If this load is increased the lateral thrust is increased. However, there is a limit to this for if the loading on the ring is increased beyond a certain point, the ring will cause excessive pressures on the shaft surface causing wear on both shaft and ring and premature breakdown of the shaft surface.

Operational traversing units of the above described general type usually have three or four rings on the shaft. One of the rings, where there are three rings, and two of the rings, where there are four rings, contacts the shaft on the opposite side to the remaining rings so that a balanced load is applied to the shaft at right angles to the axis of the shaft. Since the direction of the lateral thrust produced by a ring depends also on the side of the shaft which the ring contacts, rings contacting the shaft on opposite sides are oppositely oriented to the plane at right angles to the axis of the shaft.

The unit generally supports a guiding superstructure and this superstructure applies a moment to the shaft at each traverse reversal point. These applied moments can cause wear on the shaft and this wear is worsened if the rings and shaft are not correctly and accurately aligned. Accurate assembly may well be possible with the facilities of a well equipped workshop staffed with experienced and skilled personnel. The average user of such units may not have such facilities and for those users maintenance involving dissassembly and reassembly causes considerable problems. The solution to these problems may involve sending units away for reassembly resulting in considerable and expensive down time in plant and equipment.

According to the present invention, there is provided a traversing unit comprising a housing, a shaft rotatably mounted in the housing, a plurality of rings surrounding and in contact with the shaft, means for applying a balanced load to the shaft through the rings in planes at right angles to the axis of the shaft characterised by means for mounting the rings in the housing so as to prevent relative movement between the rings and housing in the axial direction of the shaft, but allow relative movement of the rings and housing in a direction at right angles to the axis of the shaft.

A preferred embodiment of the invention may comprise any one or more of the following advantageous features:

(a) Means are provided for enabling the angle of the plane of each ring to be adjusted to the plane normal to the shaft.
(b) The means of (a) comprises a mounting for each ring which enables the ring to rotate around the shaft and pivot about an axis at right angles to the shaft,
(c) The mounting of (b) comprises a ball race having diametrically opposed projections rotatably mounted in respective bearings disposed on a line at right angles to the axis of the shaft,
(d) The means for applying a balanced load comprises a loading member disposed to urge one of the rings directly against the shaft and the other ring or rings through the loading member against the shaft,
(e) The loading member of (d) comprises a plate,
(f) The plate of (e) is connected to the housing by dowels which permit relative sliding movement between plate and housing in a direction at right angles to the shaft,
(g) The plate of (e) forms a mounting for one bearing of each of the rings,
(h) The means for applying of (d) comprises a threaded nut screwed into a threaded extension of the means for mounting one of the rings and separately from the loading member by resilient means,
(i) The resilient means of (h) comprise one or more belleville washers or springs,
(j) The means of (a) are such as to allow each ring to be adjusted from a position on one side of the normal plane to a position on the other side of the normal plane.

Figure 2:
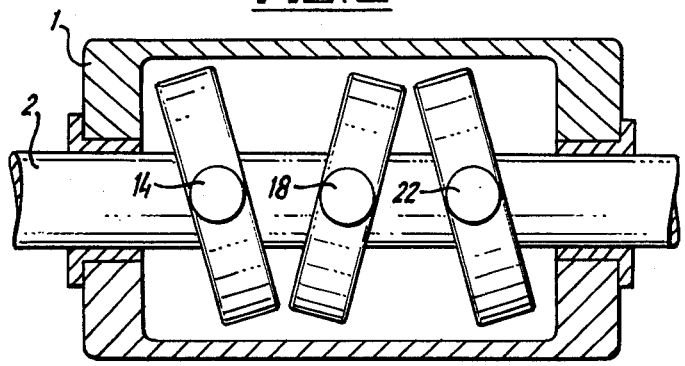
Figure 3:
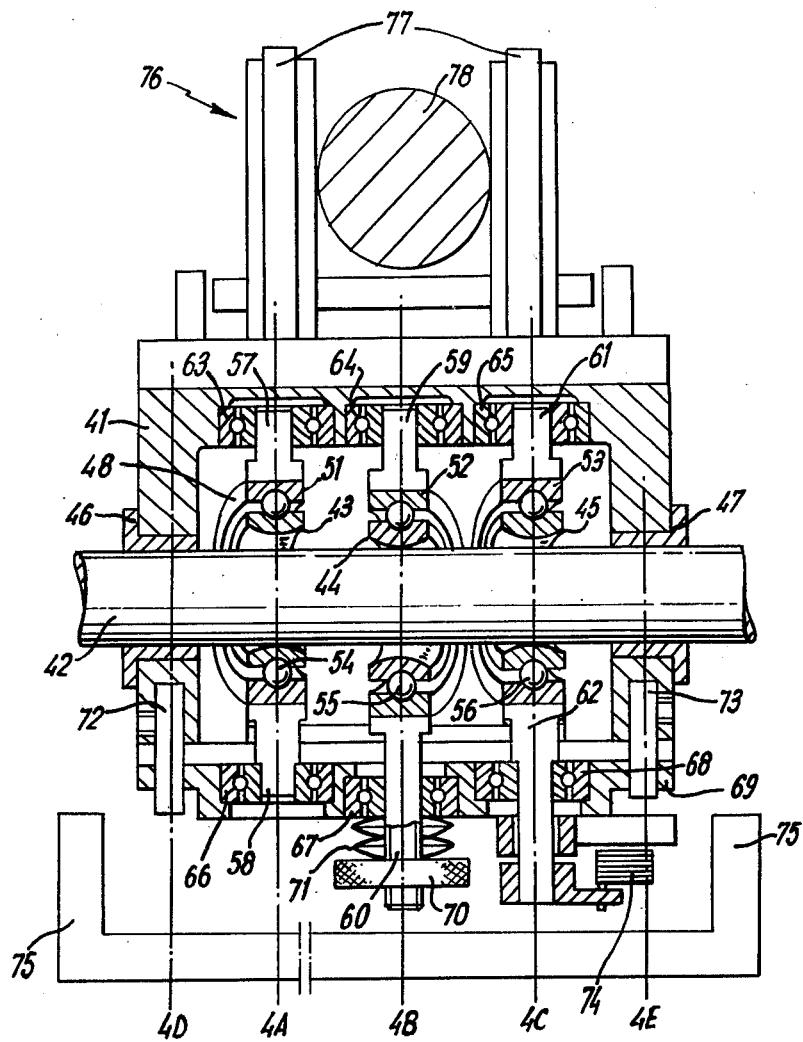

In order that the invention may be more clearly understood, one embodiment thereof will now be described, by way of example, with reference to the accompanying drawings, in which:

FIG. 1 shows a side elevational view, in cross-section, of a known traversing unit, FIG. 2 shows a plan view of the traversing unit of FIG. 1, and FIG. 3 shows a side elevational view, in cross-section, similar to FIG. 1, but of a traversing unit according to the invention.

Referring to FIGS. 1 and 2, the traversing unit comprises a housing 1, shaft 2 and rings 3, 4 and 5. The shaft 2 is mounted in the housing 1 by means of two bearings 6 and 7. Each bearing 6, 7 is disposed in the housing 1 with clearance so that it may be finely adjusted before being fixed in position. The bearings 6 and 7 are adjustably fixed in the housing 1 by corresponding bolts 6a and 7a extending through corresponding slots in the bearings. The rings 3, 4 and 5 are respectively mounted in ball races 8, 9 and 10 containing balls 11, 12 and 13. These ball races are themselves rotatably mounted by mounting pins in the housing 1 for respective rotational movement about the axes A, B and C. Thus, race 8 is so mounted via pins 14 and 15 and bearings 16 and 17, race 9 via pins 18 and 19 and bearings 20 and 21 and race 10 via pins 22 and 23 and bearings 24 and 25.

The internal surface of each ring 3, 4, 5 is externally convex (i.e. crowned) and the rings are made of hardened steel to reduce wear. Rings 3 and 5 contact the shaft 2 on the underside and ring 4 contacts the shaft 2 on the upper side. To load the shaft 2, an externally screwthreaded adjusting screw 26 is screwed into a complementary internally screw-threaded bore to urge the bearing 17 (which acts as a thrust bearing) and, through a stack of belleville washers 27 and a yoke or shoulder 28 on the race 8, the ring 3 towards the shaft 2. This load is split between the rings 3 and 5, and counterbalanced by an equal and opposite load applied to the shaft by the ring 4. After setting the load, the bearings 6 and 7 are adjusted to ensure a running clearance on the shaft in the planes D and E extending at right angles to the axis of the shaft.

In most, if not all, applications of the traversing unit, the unit supports a guiding superstructure indicated diagrammatically at 29. As the shaft 2 rotates, the unit reciprocates on the shaft between end stops 30. At each end stop 30, an extension 31 on the central ring pin 19 contacts the stop and reverses the orientation of all rings to the normal plane to the shaft thus reversing the direction of traverse of the unit. The three ring pins 15, 19 and 23 are linked together so that the reversal of the rings is achieved simultaneously. At the reversal points on the shaft 2, a torque is applied to the shaft by the superstructure 29. When the traverse is from right to left the torque applied is anticlockwise and when the traverse is from left to right the torque applied is clockwise. When the torque is anticlockwise, the housing 1 will fulcrum about the contact point of the ring 3 on the shaft 2 in plane A until the moving clearance in the bearings 6 and 7 is taken up. Excess torque is taken up by the bearings 6 and 7 in the planes D and E respectively, this being possible because the load support in plane A is flexible, the washers 27 compressing under the excess force applied. When the torque is clockwise, excess load is carried directly by the reaction provided by the rings 4 and 5 on the shaft 2 in planes B and C. In contrast to ring 3, these rings 4 and 5 are fixed directly to the housing 1. Since distance BC is approximately one quarter of distance DE the reactionary loads are approximately four times as high under this condition and can cause severe pressures being applied to the shaft resulting in scuffing and premature break down of the shaft surface at this reversal point. These torques are applied alternatively at the end of the traverse stroke and vary in magnitude according to the inertia of the guide system or additional equipment carried and its displacement from the shaft centre line. To minimise shaft wear, extremely accurate alignment between planes A, B, C and E is required and whilst this can be achieved by machine tool standards it becomes a difficult almost impossible task at maintenance shop levels.

FIG. 3 shows a view similar to FIG. 1 of a traversing unit incorporating the invention. The unit comprises a shaft 42 supported in bearings 46 and 47 in a housing 41. The housing 41 houses three rings 43, 44 and 45 respectively rotationally supported in ball races 51, 52 and 53 through balls 54, 55 and 56. The internal surfaces of the rings 43, 44 and 45 are convex (crowned) and are hardened to resist wear. The races 51, 52 and 53 are formed with diametrically opposed mounting pins 57, 58; 59, 60 and 61, 62. Pins 57, 59 and 61 are mounted in respective bearings 63, 64 and 65 and pins 58, 60 and 62 are mounted in respective bearings 66, 67 and 68. Each bearing 63 to 68 is rotatable about an axis at right angles to the axis of the shaft 42. Bearings 63, 64 and 65 are directly mounted in the housing 41 but bearings 66, 67 and 68 are mounted in a loading plate 69. The pin 60 is extended downwardly, externally screwthreaded and carries a complementary screw-threaded nut 70. A stack of belleville washers 71 are sandwiched between the nut 70 and the bearing 67. The loading plate 69 is connected to the housing 41 via two dowels 72 and 73 such that the plate 69 and parts mounted in or connected to it can slide bodily relative to the housing 41 in a direction at right angles to the axis of the shaft 42. The pin 62 is also extended downwardly and carries an actuator 74 which coacts with stops 75 to reverse the orientation of the rings 43, 44 and 45 and therefore the direction of traverse of the unit. Again the rings are linked together so that they reverse orientation simultaneously. The housing supports a guiding superstructure 76 comprising two projections 77 between which the wire 78 to be guided is disposed.

The above described unit is assembled in the following manner. The bearings 46 and 47 are fitted into the housing 41 (a conventional and relatively simple workshop operation). The bearings 43, 44 and 45 are placed in the housing 41 and the shaft inserted into the housing and through the rings 43 to 45. The loading plate 69 and bearings 66, 67 and 68 are placed in position and the dowels 72 and 73 are inserted. The loading medium (springs or belleville washers 71) and nut 70 are assembled onto mounting pin 60. The actuator 74 is then fixed to the mounting pin 62. The nut 70 is tightened to draw the rings 43, 44 and 45 onto the shaft 42 in a self centering action. The ring 44 is pulled down onto the shaft 42 in the plane 4B and the rings 43 and 45 are pushed onto the shaft 42 in the planes 4A and 4C through the action of the plate 69 on the bearings 66 and 68 and thence on the pins 58 and 62. Because the dowels 72 and 73 in the housing 41 are free to move at right angles to the shaft 42 in the loading plate 69, any excess loads caused by reversal torques on the housing 41 are transferred direct to the bearings 46 and 47 in the plane 4D and 4E. Because of the reactionary torque arm being greater, that is 4D-4E as against B-C the loads transferred to these bearings are approximately 25% of the maximum value of the excess loads applied in the case of the unit of FIG. 1 and being carried by plain bearings 46 and 47 as compared to the small contact area of the rolling rings in planes B and C eliminate or substantially reduce the problem of scuffing, permitting higher initial pressure settings to be utilised. The necessity for machine tool accuracy is also eliminated and maintenance problems reduced to zero since replacement of fixed plain bearings of the type 46 and 47 employed by this method is an everyday occurrence in maintenance shops. This method also permits greater thrust loads to the transmitter than previous systems since higher initial pressure can be used on the rolling rings the excess loads being taken on the plain bearings as explained above.

It will be appreciated that the above embodiment has been described by way of example only and that many variations are possible without departing from the scope of the invention. In particular, if desired the dowels 72 could be provided with heads.

What is claimed is:
1. A traversing unit comprising:
   a housing,
   a shaft rotatably mounted in the housing,
   a plurality of rings within said housing and surrounding and in contact with the shaft,
   means for applying a balanced load to the shaft through the rings in planes at right angles to the axis of the shaft, said balanced load applying means including unitary loading means for urging at least one of the rings directly against the shaft and for urging another ring against the shaft in the opposite direction from said one ring, and
   means for mounting the rings in the housing so as to prevent relative movement between the rings and housing in the axial direction of the shaft, but allow relative movement of the rings and housing in a direction at right angles to the axis of the shaft, said means including mounting means slidably disposed in said unitary loading means and which connect said unitary loading to the housing.

2. A traversing unit as claimed in claim 1, in which means are provided for enabling the angle of the plane of each ring to be adjusted to the plane normal to the shaft.

3. A traversing unit as claimed in claim 2, in which the means for enabling the angle of the plane of each ring to be adjusted comprises a mounting for each ring which enables the ring to rotate around the shaft and pivot about an axis at right angles to the shaft.

4. A traversing unit as claimed in claim 3, in which the mounting for each ring comprises a ball race having diametrically opposed projections rotatably mounted in respective bearings disposed on a line at right angles to the axis of the shaft.

5. A traversing unit as claimed in claim 2, in which the means for enabling the angle of the plane or each ring to be adjusted are such as to allow each ring to be adjusted from a position on one side of the normal plane to a position on the other side of the normal plane.

6. A traversing unit as claimed in claim 1, in which the loading means comprises a plate.

7. A traversing unit as claimed in claim 6, in which the plate forms a mounting for one bearing of each of the rings.

8. A traversing unit as claimed in claim 6, in which the plate is connected to the housing by dowels which permit relative sliding movement between plate and housing in a direction at right angles to the shaft.

9. A traversing unit as claimed in claim 8, in which the plate forms a mounting for one bearing of each of the rings.

10. A traversing unit comprising:
a housing,
a shaft rotatably mounted in the housing,
a plurality of rings surrounding and in contact with the shaft,
means for applying a balanced load to the shaft through the rings in planes at right angles to the axis of the shaft, said means including a loading member disposed to urge one of the rings directly against the shaft and the other ring or rings through the loading member against the shaft, and
means for mounting the rings in the housing so as to prevent relative movement between the rings and housing in the axial direction of the shaft, but allow relative movement of the rings and housing in a direction at right angles to the axis of the shaft, said mounting means including a threaded nut screwed into a threaded extension of said mounting means and separated from the loading member by resilient means.

11. A traversing unit as claimed in claim 10, in which the resilient means comprise one or more belleville washers or springs.

* * * * *